(12) United States Patent
Iyigun et al.

(10) Patent No.: US 10,101,920 B2
(45) Date of Patent: Oct. 16, 2018

(54) DISK I/O ATTRIBUTION

(71) Applicant: Microsoft Technology Licensing, LLC, Redmond, WA (US)

(72) Inventors: Mehmet Iyigun, Kirkland, WA (US); Yevgeniy M Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/199,586

(22) Filed: Jun. 30, 2016

(65) Prior Publication Data

US 2018/0004412 A1    Jan. 4, 2018

(51) Int. Cl.
    *G06F 12/00*    (2006.01)
    *G06F 3/06*    (2006.01)

(52) U.S. Cl.
    CPC ............ *G06F 3/061* (2013.01); *G06F 3/0665* (2013.01); *G06F 3/0689* (2013.01)

(58) Field of Classification Search
    CPC ....... G06F 3/061; G06F 3/0665; G06F 3/0689
    See application file for complete search history.

(56) References Cited

U.S. PATENT DOCUMENTS

| | | | |
|---|---|---|---|
| 6,301,625 B1 | 10/2001 | McDonald et al. | |
| 7,464,250 B2 | 12/2008 | Dayan et al. | |
| 7,519,725 B2 | 4/2009 | Alvarez et al. | |
| 7,716,381 B2 | 5/2010 | Ely et al. | |
| 8,015,566 B2 | 9/2011 | Lefurgy et al. | |
| 8,219,716 B2 | 7/2012 | Goyal | |
| 8,688,878 B1* | 4/2014 | Dolan | G06F 3/061 710/33 |
| 9,069,616 B2 | 6/2015 | Kadatch et al. | |
| 9,122,503 B1 | 9/2015 | Hoff | |
| 2009/0235110 A1 | 9/2009 | Kurokawa | |
| 2010/0082300 A1* | 4/2010 | Hollingsworth | G06F 3/0605 702/186 |

(Continued)

FOREIGN PATENT DOCUMENTS

CN      103984536 A      8/2014

OTHER PUBLICATIONS

Huang, et al., "A High Resolution Disk I/O Trace System", In Newsletter ACM SIGOPS Operating Systems Review, vol. 35, Issue 4, Oct. 2001, pp. 82-87.

(Continued)

*Primary Examiner* — Tuan Thai
*Assistant Examiner* — Tasnima Matin
(74) *Attorney, Agent, or Firm* — Workman Nydegger

(57) ABSTRACT

Embodiments disclosed herein are related to systems and methods for attributing disk Input/Output (IO) to one or more system entities. A disk IO attribution context is generated that defines disk IO utilization parameters for a system entity. A pointer is attached to the system entity that points to the disk IO attribution context. The pointer is exposed to system components of an underlying computer system. The pointer prompts the system components to report the disk IO utilization parameters when the system components have performed a disk IO operation for the system entity. The disk IO utilization parameters reported by the one or more system components are recorded in the disk IO attribution context.

19 Claims, 7 Drawing Sheets

(56) References Cited

U.S. PATENT DOCUMENTS

| | | | |
|---|---|---|---|
| 2011/0289059 A1* | 11/2011 | Harris, Jr. | G06F 3/0617 |
| | | | 707/654 |
| 2013/0132057 A1 | 5/2013 | Deng et al. | |
| 2013/0262805 A1* | 10/2013 | Zheng | G06F 3/0641 |
| | | | 711/162 |
| 2014/0297941 A1* | 10/2014 | Rajani | G06F 3/0644 |
| | | | 711/114 |
| 2014/0351527 A1 | 11/2014 | Traut et al. | |
| 2015/0213881 A1 | 7/2015 | Rai et al. | |

OTHER PUBLICATIONS

Wikipedia, cgroups https://web.archive.org/web/20160428014021/https://en.wikipedia.org/wiki/Cgroups Retrieved: Apr. 2016, 5 pages.

Unix & Linux, How to Throttle per process I/O to a max limit? https://web.archive.org/web/20160428180318/https://unix.stackexchange.com/questions/48138/how-to-throttle-per-process-i-o-to-a-max-limit Retrieved: Apr. 2016, 3 pages.

Waybackmachine Documentation / cgroups / blkio-controller.txt https://web.archive.org/web/20160419211523/http://www.mjmwired.net/kernel/Documentation/cgroups/blkio-controller.txt Retrieved: Apr. 2016, 6 pages.

* cited by examiner

IO Attribution Context *240*

IO Counts ~ *241*

IO Size ~ *242*

IO Service Time ~ *243*

IO Queue Time ~ *244*

Disk ID ~ *245*

DISK I/O ATTRIBUTION

BACKGROUND

Computing systems do not currently have the ability to accurately account for disk Input/Output (IO) a given process has actually performed either directly or indirectly in terms of the number of IOs performed, total size of the IOs, disk time consumed, and time spent in a disk queue. However, in many instances it would be useful to have an accurate account of disk IO for various system performance issues.

Previous attempts to accurately account for disk IO relied on making estimates about whether an IO would eventually end up hitting the disk. However, since many IOs are sent to cache and thus do not hit the disk, the estimates would often lead to over counts and under counts. In addition, there was no way to estimate the amount of disk time a process consumed in an efficient manner. Expensive detailed IO tracing analysis tools were needed to determine disk time.

Previous attempts to accurately account for disk IO were also unable to account for IOs that would appear to be done by the system, but were in reality the source of a process triggering the work. For example, a process modifies a file with buffered writes and sometime later, the cache manager writes it out to disk. Such disk IO was never attributable back to the process that modified the file.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems, methods, and computer readable medium for attributing disk Input/Output (IO) to one or more system entities. In one embodiment, an IO context component generates a disk IO attribution context. The disk IO attribution context defines disk IO utilization parameters for a system entity. A pointer component attaches a pointer to the system entity that points to the disk IO attribution context. A manager component exposes the pointer to system components of an underlying computer system. The pointer prompts the system components to report the disk IO utilization parameters when the system components have performed a disk IO operation for the system entity. A record component records in the IO attribution context the disk IO utilization parameters reported by the system components.

In another embodiment, a disk IO attribution context is generated that defines disk IO utilization parameters for a system entity. A pointer is attached to the system entity that points to the disk IO attribution context. The pointer is exposed to system components of an underlying computer system. The pointer prompts the system components to report the disk IO utilization parameters when the system components have performed a disk IO operation for the system entity. The disk IO utilization parameters reported by the one or more system components are recorded in the disk IO attribution context.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example embodiment of an IO attribution context;

DETAILED DESCRIPTION

Aspects of the disclosed embodiments relate to systems and methods for attributing disk Input/Output (IO) to one or more system entities. A disk IO attribution context is generated that defines disk IO utilization parameters for a system entity. A pointer is attached to the system entity that points to the disk IO attribution context. The pointer is exposed to system components of an underlying computer system. The pointer prompts the system components to report the disk IO utilization parameters when the system components have performed a disk IO operation for the system entity. The disk IO utilization parameters reported by the one or more system components are recorded in the disk IO attribution context.

There are various technical effects and benefits that can be achieved by implementing aspects of the disclosed embodiments. By way of example, it is now possible to accurately account for disk IO a given process has actually performed either directly or indirectly in terms of the number of IOs performed, total size of the IOs, disk time consumed, and time spent in a disk queue. In addition, it is also possible to attribute IO to a process during a buffered write or the like. Further, the technical effects related to the disclosed embodiments can also include improved user convenience and efficiency gains.

Some introductory discussion of a computing system will be described with respect to FIG. 1. Then, the system for attributing disk Input/Output (IO) to one or more system entities will be described with respect to FIG. 2 through FIG. 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
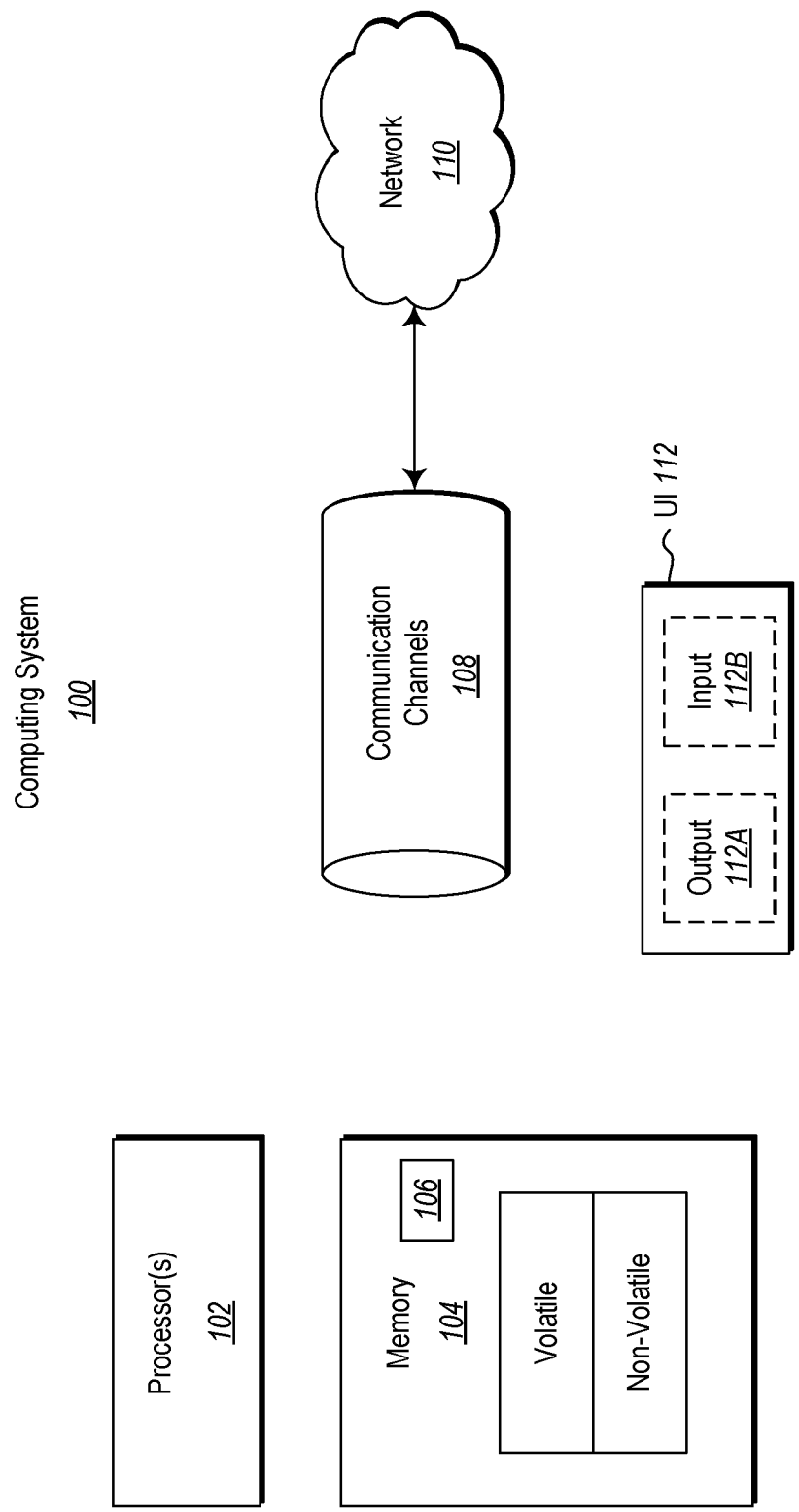
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
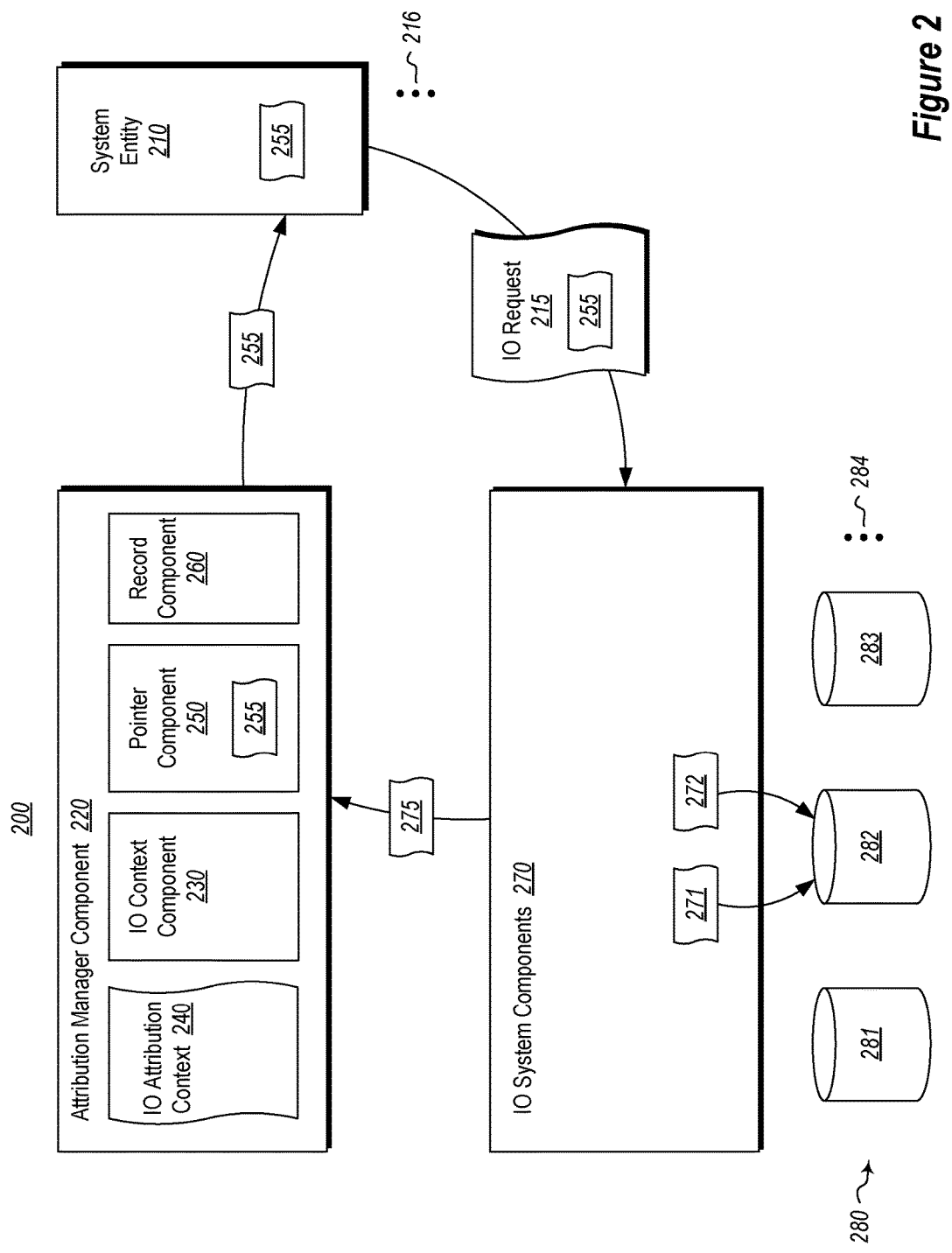
FIG. 2 illustrates an embodiment of a computing system able to attribute disk Input/Output (IO) to one or more system entities.

Attention is now given to FIG. 2, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2 and some of the components may be combined as circumstances warrant. Although not necessarily illustrated, the various components of the computing system 200 may access and/or utilize a processor and memory, such as processor 102 and memory 104, as needed to perform their various functions.

As illustrated in FIG. 2, the system 200 includes a system entity 210. The system entity 210 may be an entity that is implemented by or executed by, for example, an operating system of the system 200. The system entity 210 may be one or more jobs, one or more processes, or one or more threads associated with a process or a job. In some embodiments, the system entity 210 may be associated with a standalone application, a suite of related applications, or one or more integrated development environment applications. The system entity 210 may also be associated with one or more add-in-applications or a module such as a dynamic linked library. Accordingly, the embodiments disclosed herein are not limited by the type of the system entity 210. It will be noted that although only one system entity 210 is illustrated, the embodiments disclosed herein are applicable to any number of system entities.

The system 200 also includes an attribution manger component 220 (hereinafter also referred to as "attribution manager 220"). In operation, the attribution manager 220 manages or controls disk IO attribution for the system entity 210 by generating a disk IO attribution context that define disk IO utilization parameters and then utilizing various computing system 200 components to report the disk IO utilization parameters for inclusion in the disk IO attribution context as will be explained in more detail to follow.

Accordingly, attribution manager 220 may include an IO context component 230. In operation, the IO context component 230 generates an IO attribution context 240 that may be applied to the system entity 210. The IO attribution context 240 also defines the various disk IO utilization parameters related to disk IO operations that may be attributed to the system entity 210 when the IO operations are performed. The disk IO operations include, but are not limited to, disk reads, disk writes, or disk flushes. The disk IO operations may also include any directive or command to move data or manipulate or otherwise change data stored on a physical or virtual disk. It will be noted that the disk IO operations may include any reasonable disk IO operation and thus the embodiments disclosed herein are not limited by any particular disk IO operation.

FIG. 3 illustrates an example embodiment of the IO attribution context 240. As shown, the IO attribution context 240 defines or otherwise specifies different disk IO utilization parameters that are related to one or more of the disk IO operations. For example, a disk IO utilization parameter 241 may define or specify disk IO counts such as read counts and/or write counts, which allows the total number of reads and/or writes (or total number of a different IO operation) to be tracked. A disk IO utilization parameter 242 may define or specify IO size, which allows the total number of bytes for an IO disk operation, such as the total number of bytes read or written, to be tracked. A disk IO utilization parameter 243 may define or specify service time, which allows the amount of time from the start of an IO operation to the end of the IO operation to be tracked. A disk IO utilization parameter 244 may define or specify queue time, which allows the amount of time that an IO operation is placed in a system queue to be tracked. A disk IO utilization parameter 245 may define or specify the actual physical or virtual disk where the IO operation is performed, which allows such disk to be tracked. It will be noted that there may be any number of additional disk IO utilization parameters that may also be included in the disk IO attribution context 240, which is illustrated in FIG. 3 by the ellipses 246. Specific examples of the disk IO utilization parameters being utilized by the computing system 200 will be explained in more detail to follow.

Returning to FIG. 2, the attribution manager 220 includes a pointer component 250. In operation, the pointer component 250 generates a pointer 255 that points to or maps to the IO attribution context 240. In some embodiments, the pointer 255 may point to only one of the disk IO utilization parameters 241-246, all of the disk IO utilization parameters, or any combination thereof. In this way, it is possible for the attribution manager 220 to customize the attribution of the IO for the system entity 210 as circumstances warrant. As shown in FIG. 2, the pointer component 250 may attach or otherwise associate the pointer 255 with the system entity 210.

It will be noted that in some embodiments, the pointer 255 may not be an actual memory pointer. In such embodiments, the pointer component 250 or another element of the attribution manager 220 may choose to employ a level of indirection where the underlying I/O system components 270 (or the components discussed in FIGS. 4A-4C below) get an "identifier" for the disk IO attribution context. The attribution manager 220 may then convert that identifier into an actual memory pointer 255 to the IO attribution context 240 to record the data into. Accordingly, the embodiments disclosed herein are not limited by any particular type of memory pointer as the embodiments contemplate various memory pointers as circumstances may warrant.

The computing system 200 also includes disk IO system components 270. The disk IO system components 270 represent various operating system components such as kernel level components that are able to perform a disk IO operation on behalf of the system entity 210. The disk IO system components 270 may include IO managers, cache mangers, filter drivers, volume drivers, hardware drivers and the like that may be implemented in a stack. A specific example of the disk IO system components 270 will described in more detail to follow. It will be noted that the embodiments disclosed herein are not dependent on any specific implementation of the disk IO system components 270 as various implementations are contemplated. Accordingly, the embodiments disclosed herein are not to be limited by any specific implementation of the disk IO system components 270.

The computing system 200 may also include disks (hereinafter collectively referred to as "disks 280") 281, 282, 283, and any number of additional disks as illustrated by ellipses 284. The disks 280 may be any reasonable physical disk that is used to read and write data to. In addition, in some embodiments, the disks 280 may be virtual disks or the like that act like physical disks from the perspective of the computing system 200. Accordingly, the embodiments disclosed herein are not limited by the type of the disks 280.

As shown in FIG. 2, the system entity 210 may make a disk IO request or call 215 to the disk IO system components 270. The disk IO request 215 may specify one or more disk IO operations such as those discussed previously that the disk IO system components 270 may perform on behalf of the system entity 210 and the one or more disks 280 that such operation should occur at. For example, the disk IO request 215 may specify a read or write of data stored in one or more of the disks 280. Because the pointer 255 has been attached to the system entity 210 by the attribution manager 220, the pointer 255 may be included as part of the disk IO request 215 and may be exposed to the disk IO system components 270 as the disk IO system components 270 process the disk IO request 215. In other words, in some embodiments, the pointer 255 may be included in the data structure of the disk IO request 215 in addition to those elements normally included in the data structure of the disk IO request 215.

It will be noted that for ease of explanation, the following discussion is based on a single disk IO request 215. However, in many embodiments the system entity 210 may make any number of additional disk IO requests as circumstances warrant. These additional disk IO requests are shown by the ellipses 216 and the discussion relating to the disk IO request 215 will also apply to any of the additional disk IO requests 216.

The disk IO system components 270 may then process the IO request 215 so that the disk IO operation is performed. It will be noted that the actual functionality of how the disk IO system components 270 perform a disk IO operation will be based on the type of platform or system that implements the disk IO system components 270. Accordingly, the embodiments disclosed herein are not limited by the specific functionality of the disk IO components 270.

For example, if the IO request 215 specified that a read operation should be performed for data stored in one of the disks 280, then the disk IO system components 270 would read the data. This is conceptually illustrated in FIG. 2, where a read disk IO operation 271 is shown as being performed so that data is read in the disk 282.

Likewise, if the IO request 215 specified that a write operation should be performed for data stored in one or more of the disks 280, then the disk IO system components 270 would write the data. This is conceptually illustrated in FIG. 2, where a write disk IO operation 272 is shown as being performed so that data is written in the disk 282.

Once the disk IO system components 270 have performed the disk IO operation specified by the disk IO request 215, the pointer 255 may prompt or otherwise cause the disk IO system components 270 to send a report 275 that reports the one or more of the IO utilization parameters 241-246 that are included in the pointer 255 to the attribution manager 220 so that the one or more of the IO utilization parameters 241-246 may be attributed to the system entity 210. In some embodiments, the report 275 may be implemented by one or more APIs that are exposed by the attribution manager 220 to allow one or more of the disk IO system components 270 to make a call to the attribution manager 220 to report the one or more of the disk IO utilization parameters 241-246.

For example, if the disk IO operation were either the read and write disk IO operations 271 and 272 or both of these disk IO operations, and the pointer 255 included counts 241 as a disk IO utilization parameter, then the disk IO system components 270 would send a report 275 that specified the total number of reads and/or writes performed for the system entity 210. In other words, if there were x number of reads performed and y number of writes performed, then the report 275 would specify both x and y. In some embodiments, x and y could be reported separately and in other embodiments they could be combined into a single count.

In like manner, if the pointer 255 included IO size 242 as a disk IO utilization parameter, then the report 275 may include the total number of bytes of data read and/or written for the system entity 210. For example, if the total amount of data read and/or written was 10 Mbytes, then the record 275 would specify this amount of data.

Similarly, if the pointer 255 included service time 243 as a disk IO utilization parameter, the record 275 may also include the service time for the disk IO operation. As previously discussed, the service time may measure the time between when the disk IO operation begins and ends. For example, when the disk IO system components 270 begin to read or write data in one or more of the disks 280, the disk IO system components 270 may determine the start time of the disk IO operation. The disk IO system components 270 may then determine the end time of the disk IO operation once the disk IO operation is complete. The time period between the start and end of the disk IO operation constitutes the service time and this may be specified in the record 275.

Likewise, if the pointer 255 included queue time 244 as a disk IO utilization parameter, the record 275 may also include the queue time for the disk IO operation. In many disk IO system components 270, the disk IO request 215 may be placed in a queue such that the disk IO operation is not performed for some delayed period of time. This may be due to processing resource constraints, policy considerations that cause other operations to have preferential treatment, or the like. In such cases, the disk IO system components 270 may track the time that the disk IO request 215 is placed in the queue. The queue time may then be specified in the record 275. The queue time will be discussed in more detail to follow.

In some embodiments, the disk IO operation such as the disk IO operations 271 and 272 may be performed using more than one of the disks 280. In such embodiments, the record 275 may specify which of disks 280 the disk IO operation occurred at. For example, if a read operation occurred at disk 281 and a write operation occurred at disk 282, the record 275 would record an identifier for the disks 281 and 282. In this way, it is possible to determine the actual disk where the disk IO operation occurs.

As previously discussed, the report 275 may then be provided by the disk IO system components 270 to the attribution manager 220. The attribution manager 220 may include a record component 260. In operation, the record component 260 may receive the report 275 that informs the record component 260 of one or more of the disk IO utilization parameters 241-246 when the disk IO system components 270 has performed the disk IO operation for the system entity 210. The record component 260 may then record the one or more disk IO utilization parameters 241-246 in the disk IO attribution context 240. Since the disk IO attribution context 240 may be stored in a memory, such as memory 104, which is accessible to the attribution manager 220, it is possible to query the record component 260 for the IO attribution context 240. In this way, it is possible to obtain reliable information regarding the disk IO utilization parameters that are attributable to the system entity 210.

Figure 4A:
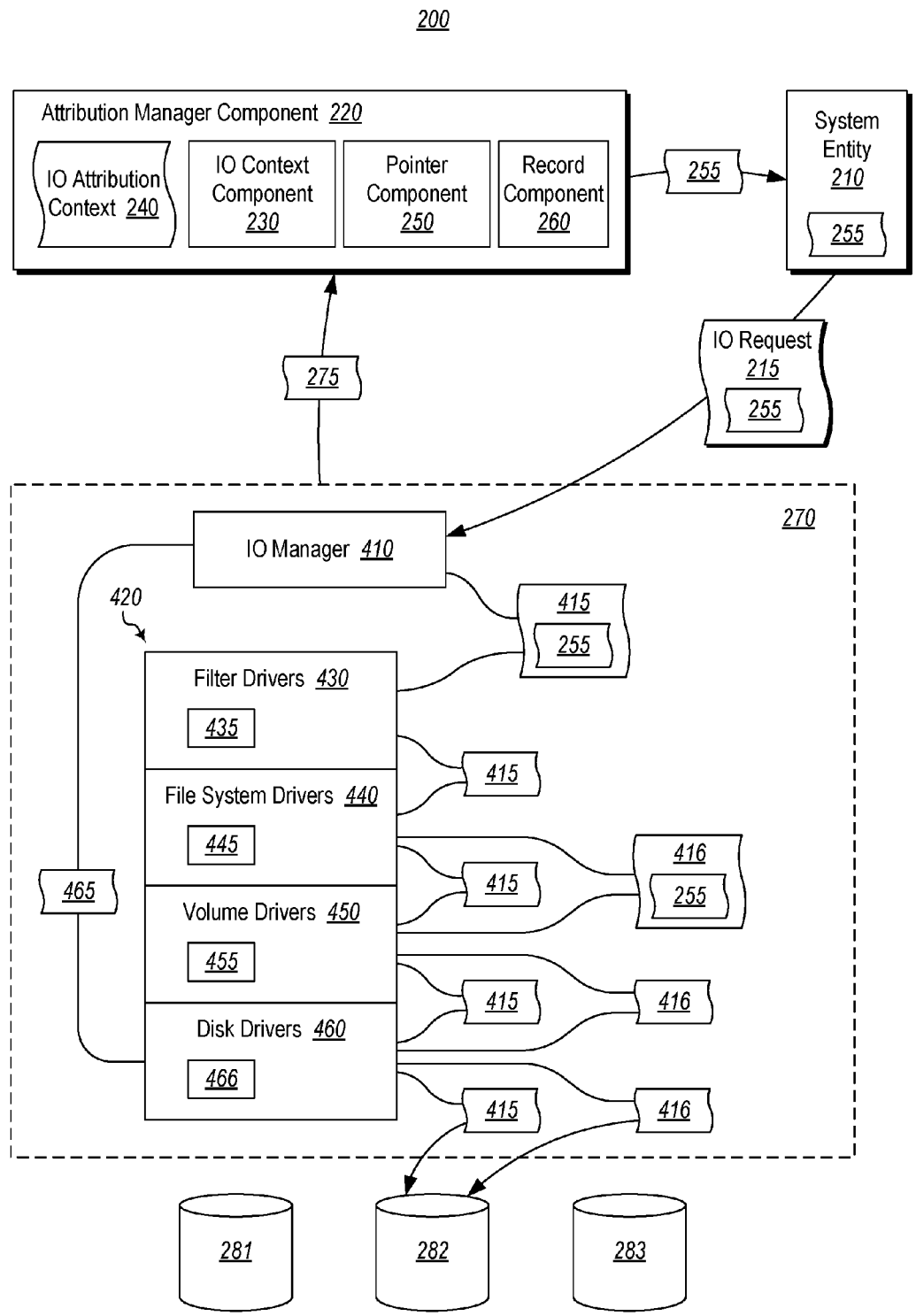
FIGS. 4A-4C illustrate a specific embodiment of the computing system of FIG. 2.
Figure 4B:
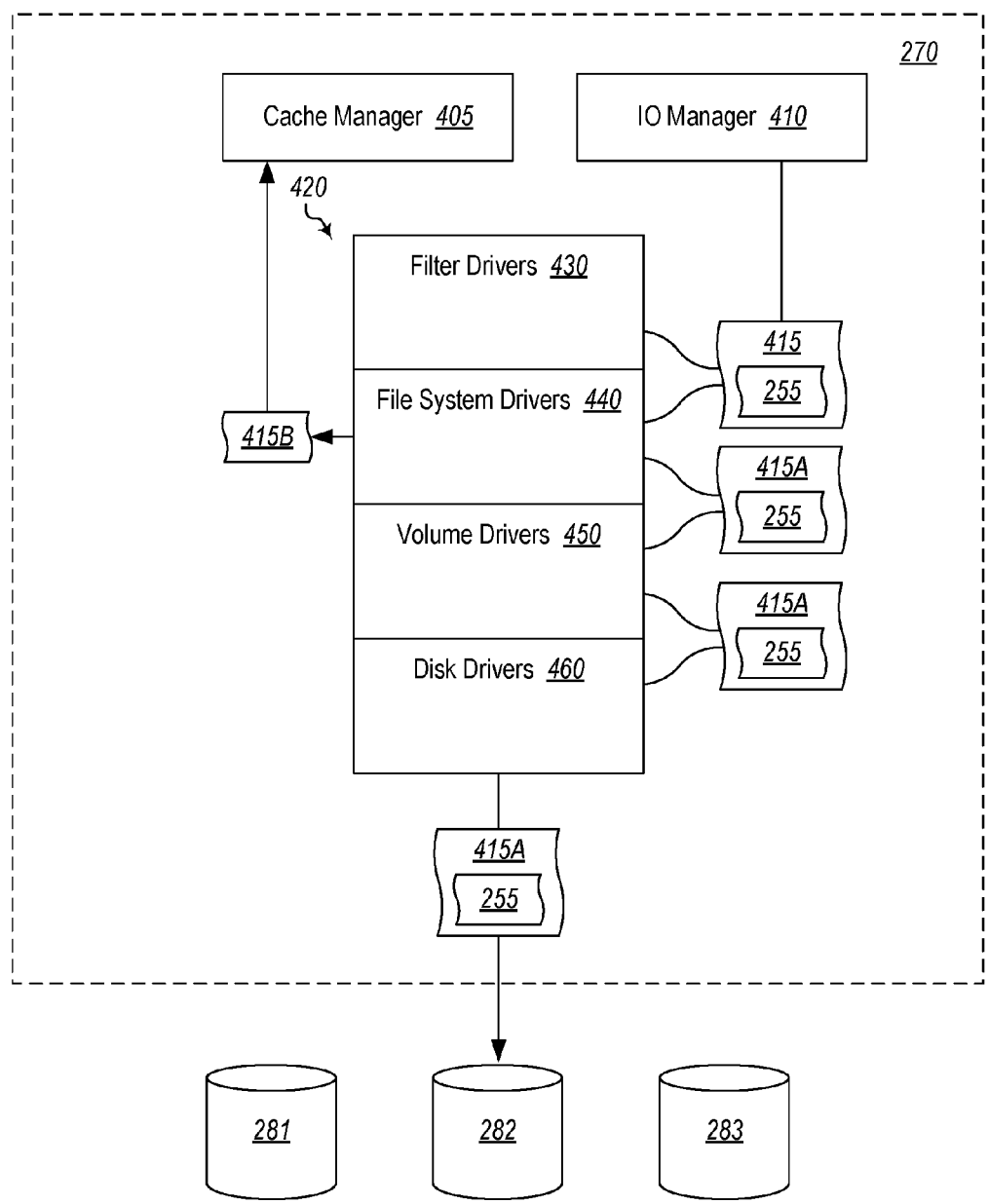
Figure 4C:
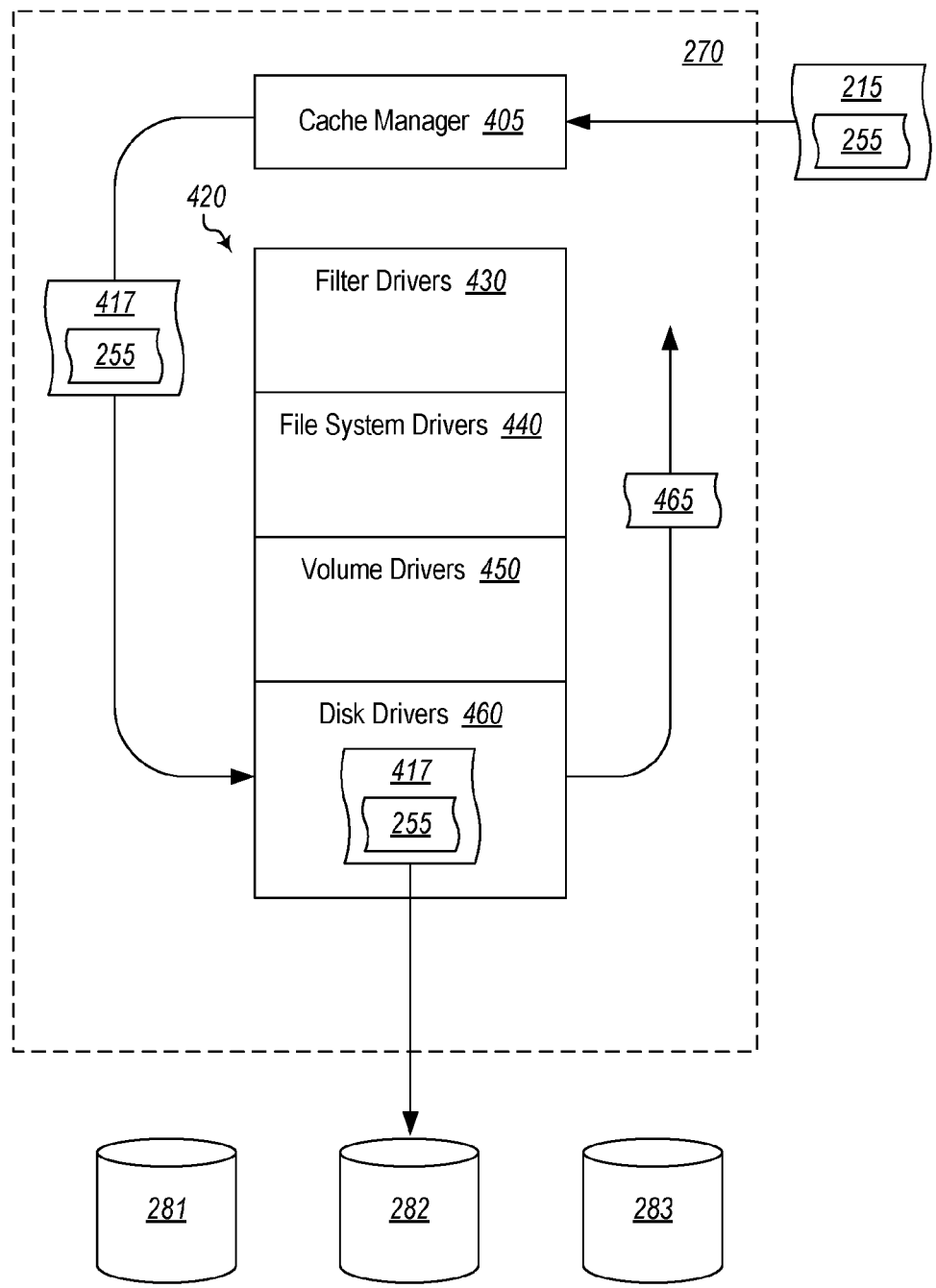

Attention is now given to FIGS. 4A-4C, which illustrate a specific embodiment of the computing system 200. In particular, FIGS. 4A-4C illustrate a specific embodiment of the disk IO system components 270. Accordingly, those elements that are the same as FIG. 2 will not be described again in relation to FIGS. 4A-4C.

As illustrated in FIG. 4A, the specific embodiment of the disk IO system components 270 includes an IO manager 410 that in operation controls the disk IO operation. In one embodiment, the IO manager 410 receives the disk IO request 215 that has the pointer 255 attached to it from the system entity 210 in the manner previously described. In other embodiments, the pointer module 250 may provide the pointer 255 to the IO manager 410 after the IO manger 410 has received the disk IO request 215. In either case, the IO manager 410 may then generate a disk IO packet 415 that includes the pointer 255 and which may expose the pointer 255 to other system components of an IO stack as will be explained. As previously explained, the pointer 255 may be a direct memory pointer or it may be an identifier. The disk IO packet 415 may include a data structure that specifies the disk IO operations, such as disk IO operations 271 and/or 272, which are to be performed. As previously described, this data structure may also include the pointer 255. It will be noted that the discussion of the disk IO packet 415 may also apply to the disk IO request 215 in those embodiments that implement the disk IO system components 270 discussed in relation to FIG. 2.

It will also be noted that for ease of explanation, the following discussion is based on a single disk IO packet 415. However, in many embodiments the IO manager 410 may generate any number of additional disk IO packets as circumstances warrant. These additional disk IO packets are shown by the ellipses 411 and the discussion relating to the disk IO packet 415 will also apply to any of the additional disk IO packets 411.

As shown in FIG. 4A, the IO system components 270 may also include various drivers conceptualized as an IO stack 420 including filter drivers 430, file system drivers 440, volume drivers 450, and disk drivers 460. As illustrated, the disk drivers 460 may have access to the disks 280 as previously described.

The disk IO packet 415 may traverse down the IO stack 420 from one driver level to the next driver level as shown in FIG. 4. For example, the disk IO packet 415 may first go to the filter driver 430, where various filtering may occur as needed. The filter driver 430 may then pass the disk IO packet 415 to the file system driver 440. The file system driver 440 may perform file system operations as needed such as determining where and how the data specified in the disk IO packet 415 is to be accessed and may then pass the disk IO packet 415 to the volume driver 450. The volume driver 450 may perform volume operations as needed such as determining the disk volume of the data specified in the disk IO packet 415 and may then pass the disk IO packet 415 to the disk driver 460.

The disk driver 460 is the IO stack 420 element that performs the actual disk IO operation specified in the disk IO packet 415. For example, the disk driver 460 may read and/or write data in one of the disks 280, such as disk 282 as shown in FIG. 4. The disk drive 460 may also perform any other disk IO operation specified by the disk IO packet 415.

Once the disk IO operation begins and/or ends, the disk driver 460 may track or record the disk IO utilization parameters 241-246 included in the pointer 255 in the manner previously discussed. Once the disk driver 460 has recorded or tracked the disk IO utilization parameters 241-246, the pointer 255 may prompt or otherwise cause the disk driver 460 to provide a report 465 to the IO manager 410 that reports the one or more of the IO utilization parameters 241-246 that are included in the pointer 255. The report 465 may be implemented by one or more APIs that are exposed by the IO manager 410 or the attribution manager 220 to allow the disk driver 460 to make a call to the IO manager 410 to report the one or more of the IO utilization parameters 241-246. The IO manager 410 may then provide the report 275 to the report component 260 in the manner previously described. In some embodiments, however, the disk driver 460 may provide the report 465 directly to the record component 260 without the need for the IO manager 410 to provide the report 275.

FIG. 4A also shows that in some embodiments, one or more of the drivers in the IO stack 420 may also generate a disk IO packet as circumstances warrant from the disk IO packet 415 to help the driver perform the disk IO operation. When this happens, the pointer 255 is also attached to the new disk IO packet. For example, as illustrated in the figure the file system driver 440 may generate a disk IO packet 416 which has the pointer 255 attached to it. When the disk IO packet 416 is passed down the stack to the disk driver 460, the pointer 255 of the disk IO packet 416 may cause that a record 465 be provided that records any of the IO utilization parameters associated with the disk IO operation specified by the disk IO packet 416 in the manner previously described.

It will be noted that although FIG. 4A shows that the file system server driver 440 generated one additional disk IO packet, this is for ease of explanation only as any number of additional disk IO packets may also be generated, each of which will include the pointer 255. Further, the other drivers of the IO stack 420 may also generate additional disk IO packets as circumstances warrant, each of which may also include the pointer 255. Thus, any combination of the drivers of the IO stack 420 may also generate additional disk IO packets as circumstances warrant. Accordingly, this shows that the pointer 255 may be attached to multiple disk IO packets (or multiple disk IO calls 215 of FIG. 2), which may result in any of the disk IO operations specified by the multiple disk IO packets (or disk IO calls 215) being attributed to the system entity 210 in the disk IO attribution context 240.

FIG. 4A also shows a queue 435, a queue 445, a queue 455 and a queue 466. Each of these queues is meant to represent that at any of the driver levels in the IO stack 420, the disk IO packets 415 (and/or 416) may be queued by one or more of the drivers. It will be noted that a queue may occur at one of the levels or at multiple levels. Of course, in some embodiments there may be no queuing that occurs. As discussed above, the disk IO packet 415 may be queued due to system processor limitations, policy considerations that give system entities higher priority than system entity 210, or due to other system limitations.

When the disk IO packet 415 is placed into one of the queues, the pointer 255 may prompt the driver of that level to record in the pointer 255 the amount of time that the disk IO packet 415 remains in the queue. This may latter be included in the report 265 and/or the report 275. Alternatively, the driver may generate a record (not illustrated) that may directly report the queue time to the IO manager 410, which may then report this to the attribution manager 220 or the driver may generate a record (not illustrated) that directly reports the queue time to the attribution manager 220. For example, if the file system driver 440 places the disk IO packet 415 in the queue 445, the file system driver may record the queue time in the pointer 255 or may report the queue time to the IO manager 410 and/or attribution manager 220 as described. In this way, any queue time is able to be correctly attributed to the system entity 210 in the attribution context 240.

In some embodiments, both the service time 243 and the queue time 244 may be determined as being non-overlapping or cumulative. For example, suppose that the system entity 210 issued multiple disk IO requests 215 and 216 at the same time that were then all placed in a queue by one of the drivers, such as the queue 445 by the file system driver 430 during the same one second clock cycle. If the file system driver 430 recorded the time that each request entered the queue and left the queue, then the queue time may be recorded as being three seconds since each of the requests was in the queue for the one second clock cycle. For some embodiments, this cumulative record of three seconds might be desirable. However, in other embodiments the attribution manager 220 may record or mark which portions of the queue time have already been reported so that the total queue time may only be at most the one second clock cycle. This prevents over counts for queue time for the multiple disk IO requests and provides a more realistic queue time recording in the attribution context 240. In like manner, the service time 243 may be recorded as being cumulative or non-overlapping when multiple disk IO requests use multiple of the disks 280.

FIG. 4B shows that the disk IO components 270 may also include a cache manager and/or memory manager 405 (herein simply referred to as "cache manager 405"). As illustrated, the IO manger 410 may generate the disk IO packet 415 and may pass the packet to the filter driver 430 as previously discussed. The filter driver 430 may perform any required filtering and may then pass the disk IO packet 415 to the file system driver 440 as also previously described.

In the embodiment of FIG. 4B, the disk IO packet 415 may include, for example, a read disk IO operation that specifies a read of a specific 10 Mbyte of data. However, when the disk IO packet 415 reaches the file system driver 440, the file system driver may determine that a portion, for instance 9 Mbytes, of the 10 Mbyte of data to be read is already available to the system in the cache manager 405 and thus does not need to be read from one of the disks 280. Accordingly, the file system driver 440 may generate a disk IO packet 415B that is provided to the cache manager 405. The disk IO packet 415B may cause the cache manager 405 to ensure that the 9 Mbytes of data are read on behalf of the system entity 210 in the manner suitable to the specific platform of the computing system 200.

The disk IO packet 415 may also be updated by the file system driver 440 to reflect that only the 1 Mbyte of data not in the cache will actually be read from one or more of the disks 280. This is reflected in FIG. 4B by disk IO packet 415A. It will be noted that the pointer 255 is only included in the disk IO packet 415A since the read specified in the disk IO packet 415B is not a disk IO operation.

The disk IO packet 415A may then be passed to the volume driver 450 and the disk driver 460, where the read IO operation for the 1 Mbyte of data will be performed. The disk driver 460 may then provide the record 465 to the IO manager 410 or the record component 260 as previously described so that the attribution context 240 may be updated.

It will be noted that in this embodiment the record 465 only records those IO utilization parameters 241-246 that are related to the read that was performed on the 1 Mbyte of data. Since the read of the 9 Mbyte of data in the cache was not a disk IO operation, no record of the IO utilization parameters 241-246 is made for this IO operation. In this way, only those IO operations that actually occur at one or more of the disks 280 are recorded in IO attribution context 240. This advantageously allows the IO attribution context to only reflect actual disk IO operations and not IO operations that do not ultimately reach the disks 280 such as the read specified in the disk IO packet 415B.

FIG. 4C illustrates an embodiment where the disk IO request 215 including the pointer 255 is directed to the cache manager 405 by the computing system 200. This may occur for a buffered write where the data specified in the IO request 215 is to be written to one or more of the disks 280 after a delayed amount of time. This delay may occur when the system determines that writing the data is not time sensitive or where system resources are not able to perform the write at the time the system entity 210 requests the write. It will be noted that other IO operations may be buffered as well and that other system components besides the cache manager 405 such as a memory manager may also buffer a disk IO request. It will also be noted that control of the disk IO operation is passed from the IO manager 410 to the cache manager 405 (or other system component) when the disk IO request 215 is placed in the cache.

It should be further noted that the cache manager 405 stores the pointer 255 of the system entity that issued the buffered write (or mapped file modification in the case of memory manager mapped files). This stored entity will later be used to issue disk write packets, which drivers will use to record IO attribution for the original system entity. Further, in some embodiments, the cache manager 405 may employ simple heuristics like the "last system entity the modified the file" to record all writes to that file to that system entity. In other embodiments, the cache manager 405 may choose to employ techniques that maintain a more detailed breakdown of storing multiple system entity IO pointers for different portions of the file that were modified.

After the delayed amount of time has occurred, the cache manager 405 may generate a disk IO packet 417 that specifies the buffered disk IO operation such as the buffered write and also exposes the pointer 255 to the components of the IO stack 420. The disk IO packet 417 may traverse the IO stack 420 in the manner previously described for the disk IO packet 415 and so this process will not be further explained. When the disk IO packet 417 reaches the disk driver 460, the disk driver 460 may perform the disk IO operation in the manner previously described and may then generate the record 465, which may be ultimately provided to the attribution manager 220 as previously described. Advantageously, by having the disk IO packet 417 expose the pointer 255, the IO utilization parameters 241-246 that are related to buffered disk IO operation may also be attributed to the system entity 210. In other words, by exposing the pointer 255 for buffered disk IO operations it is possible to attribute IO to the system entity for those disk operations that are placed in the a buffer. Without the use of the pointer 255, there would be no way to know which system entity was the originator of the disk IO request since control of the IO operation passed to the cache manager.

In some embodiments, the cache manager 405 may perform read ahead for the system entity. When a system entity issues a buffered read, the cache manager may decide to speculatively read more of the file data in anticipation that the entity will read it soon. Whenever such read ahead is performed, the correct entity's pointer 255 is set in the disk packets for those reads, such that those disk IOs are correctly accounted for as well.

Although the previous discussion has focused on a single disk IO attribution context 240 that is applied globally to the disk IO for the system entity 210, in some embodiments there may be multiple IO attribution contexts that track different IO utilization parameters. For example, in one embodiment a second disk IO attribution context may be attached to either the disk IO request 215 or the disk IO packet 415 for a specific volume. Whenever the disk IO operation is performed on the specific volume, a report may be generated by the volume driver of the specific volume and this may be recorded in the second disk IO attribution context in addition to anything that is recorded in the disk IO attribution context 240. In like manner, any number of additional disk IO attribution contexts may be attached to the disk IO request 215 or the disk IO packet 415 and each can track different IO utilization parameters for different purposes in the same manner as previously discussed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
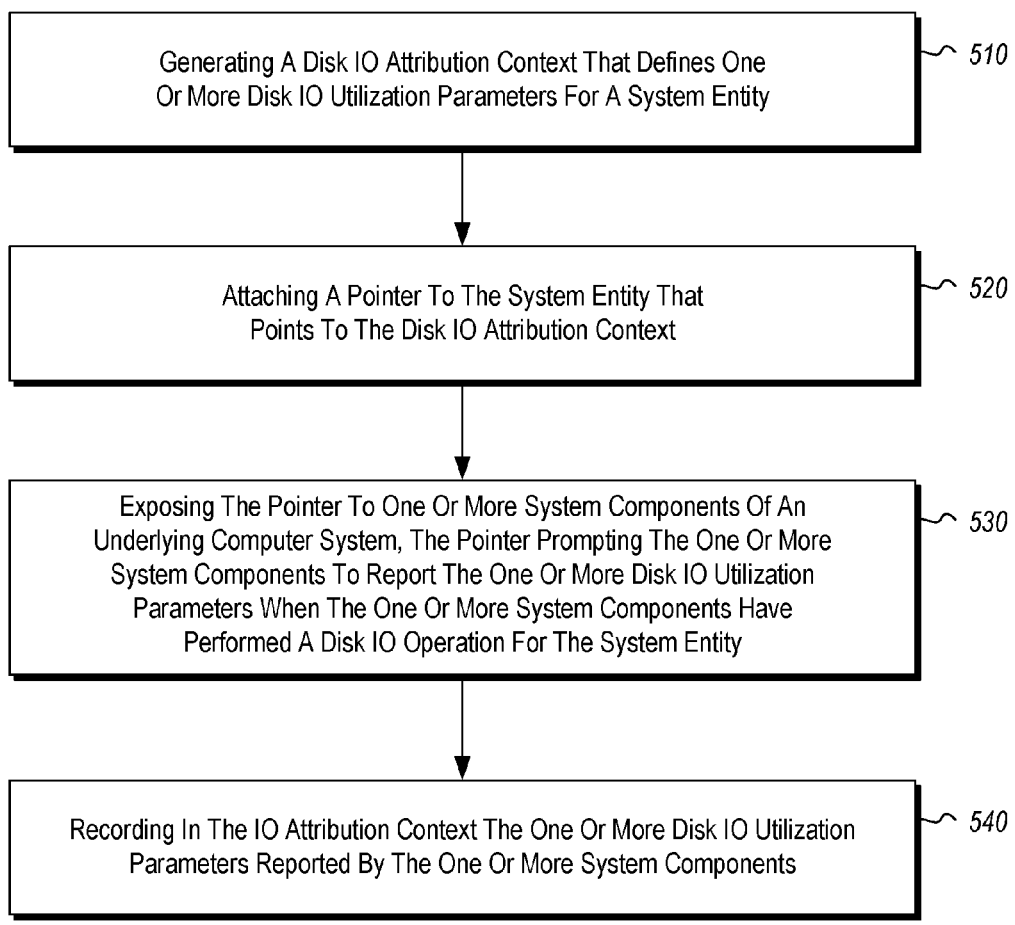
FIG. 5 illustrates a flow chart of an example method for attributing disk IO to one or more system entities.

FIG. 5 illustrates a flow chart of an example method 500 for attributing disk IO to one or more system entities. The method 500 will be described with respect to FIGS. 2-4 discussed previously.

The method 500 includes an act of generating a disk IO attribution context that defines one or more disk IO utilization parameters for a system entity (act 510). For example, as previously described, the IO context component may generate a disk IO attribution context 240 for the system entity 210. In some embodiments, the system entity 210 may be a job, a process, or a thread. The IO context 240 may define disk IO utilization parameters 241-246. As discussed, the disk IO utilization parameters 241-246 may include, but are not limited to, one or more of disk IO count, disk IO size, disk IO service time, disk IO queue time, and an identifier for a physical or virtual disk.

The method 500 includes an act of attaching a pointer to the system entity that points to the IO attribution context (act 520). For example, as previously described, the pointer component 250 may attach the pointer 255 to the system entity 210.

The method 500 includes an act of exposing the pointer to one or more system components of an underlying computer system (act 530). The pointer may prompt the one or more system components to report the one or more disk IO utilization parameters when the one or more system components have performed a disk IO operation for the system entity. For example, as previously described the pointer 255 may be exposed to the IO system components 270, which in some embodiments may include the components of the IO stack 420. In some embodiments, the pointer 255 may be exposed by one or more of the attribution manager 220, the IO manager 410, or the cache manager 405 as these manager components include the pointer 255 in an IO request or an IO packet. As previously described, the pointer 255 may prompt the IO system components 270 such as disk driver 460 to generate the report 275 or 465 that reports the disk IO utilization parameters 441-446 when the IO system components 270 have performed a disk IO operation.

The method 500 includes an act of recording in the IO attribution context the one or more disk IO utilization parameters reported by the one or more system components. For example, as previously described the record component 260 may receive the report 275 or 465 from the IO system components 270. The record component may then record the disk IO utilization parameters 441-446 included in the report in the disk IO attribution context 440.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for tracking and recording disk Input/Output (IO) and attributing the disk Input/Output (IO) to one or more system entities, the system comprising one or more computer processors and computer memory, the system configured to:
    generate a disk IO attribution context, the disk IO attribution context being a data structure that defines one or more disk IO utilization parameters for a system entity and into which disk IO utilization data corresponding to the one or more disk IO utilization parameters can be recorded;
    attach a pointer to the system entity that points to the disk IO attribution context;
    expose the pointer to one or more system components of an underlying computer system, the pointer prompting the one or more system components to report the one or more disk IO utilization parameters when the one or more system components have performed a disk IO operation for the system entity;
    receive one or more reports from the one or more system components, the reports including disk IO utilization data corresponding to the one or more disk IO utilization parameters associated with the one or more system components; and
    record in the IO attribution context the one or more disk IO utilization parameters reported by the one or more system components.

2. The system of claim 1, wherein the one or more disk IO utilization parameters comprise disk IO counts.

3. The system of claim 1, wherein the one or more disk IO utilization parameters comprise disk IO size or disk IO service time.

4. The system of claim 3, wherein the disk IO service time is recorded in the attribution context in one of non-overlapping form or in cumulative form.

5. The system of claim 1, wherein the system is further configured to generate a second disk IO attribution context, and wherein a second pointer points to the second disk IO attribution such that IO attribution can be assigned to a group of disks of the one or more system components based on a volume of the group of disks.

6. The system of claim 1, wherein the one or more disk IO utilization parameters comprise disk IO queue time.

7. The system of claim 6, wherein the disk IO queue time is recorded in the attribution context in one of non-overlapping form or in cumulative form.

8. The system of claim 1, further comprising a cache manager component and/or a memory manager that is configured to perform delayed writes and/or speculative reads on behalf of the one or more system components and provides the correct pointer for the one or more system components.

9. The system of claim 1, wherein the system entity is a first system entity, wherein the pointer is attached to a second system entity such that the disk IO utilization parameters of the second system entity are recorded in the IO attribution context.

10. The system of claim 1, wherein the system is further configured to expose the pointer to the one or more system components by including the pointer is a disk IO request or disk IO packet.

11. The system of claim 10, wherein at least one of the one or more system components generates a second disk IO request or second disk IO packet that includes the pointer.

12. The system of claim 1, wherein the system entity is one of a job, a process, or a thread.

13. The system of claim 1, wherein the one or more disk IO utilization parameters comprise a physical or virtual disk identifier.

14. The system of claim 1, wherein the disk IO attribution context is a first disk IO attribution context, wherein a second IO attribution context is generated that records one or more disk IO utilization parameters for disk IO operations associated with a specific portion of the one or more system components.

15. A method for tracking and recording disk Input/Output (IO) and attributing the disk Input/Output (IO) to one or more system entities, the method comprising:
    generating a disk IO attribution context, the disk IO attribution context being a data structure that defines one or more disk IO utilization parameters for a system entity and into which disk IO utilization data corresponding to the one or more disk IO utilization parameters can be recorded;
    attaching a pointer to the system entity that points to the disk IO attribution context;
    exposing the pointer to one or more system components of an underlying computer system, the pointer prompting the one or more system components to report the one or more disk IO utilization parameters when the one or more system components have performed a disk IO operation for the system entity;
    receiving one or more reports from the one or more system components, the reports including disk IO utilization data corresponding to the one or more disk IO utilization parameters associated with the one or more system components; and
    recording in the IO attribution context the one or more disk IO utilization parameters reported by the one or more system components.

16. The method of claim 15, wherein the one or more disk IO utilization parameters comprise one or more of disk IO counts, disk IO size, disk IO service time, and disk IO queue time.

17. The method of claim 16, wherein the disk IO queue time and/or the disk IO service time are recorded in the attribution context in one of non-overlapping form or in cumulative form.

18. A computer program product comprising one or more computer-readable storage devices having thereon computer-executable instructions that are structured such that, when executed by one or more processors of an underlying computing system, adapt the computing system to performing the following:

generate a disk IO attribution context, the disk IO attribution context being a data structure that defines one or more disk IO utilization parameters for a system entity and into which disk IO utilization data corresponding to the one or more disk IO utilization parameters can be recorded;

attach a pointer to the system entity that points to the disk IO attribution context;

expose the pointer to one or more system components of an underlying computer system, the pointer prompting the one or more system components to report the one or more disk IO utilization parameters when the one or more system components have performed a disk IO operation for the system entity;

receive one or more reports from the one or more system components, the reports including disk IO utilization data corresponding to the one or more disk IO utilization parameters associated with the one or more system components; and record in the IO attribution context the one or more disk IO utilization parameters reported by the one or more system components.

19. The computer program product of claim 18, wherein the one or more disk IO utilization parameters comprise one or more of disk IO counts, disk IO size, disk IO service time, and disk IO queue time.

* * * * *